US010606247B2

(12) United States Patent
Hoernicke et al.

(10) Patent No.: US 10,606,247 B2
(45) Date of Patent: Mar. 31, 2020

(54) CONFIGURING PROCESS MODULES FOR OPERATION IN PLANTS

(71) Applicant: ABB Schweiz AG, Baden (CH)

(72) Inventors: Mario Hoernicke, Landau (DE); Chaojun Xu, Weinheim (DE); Axel Haller, Gorxheimertal (DE); Rainer Drath, Mannheim (DE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/775,737

(22) PCT Filed: Nov. 16, 2015

(86) PCT No.: PCT/EP2015/076644
§ 371 (c)(1),
(2) Date: May 11, 2018

(87) PCT Pub. No.: WO2017/084684
PCT Pub. Date: May 26, 2017

(65) Prior Publication Data
US 2018/0329398 A1 Nov. 15, 2018

(51) Int. Cl.
*G05B 19/418* (2006.01)
*G06F 16/25* (2019.01)

(52) U.S. Cl.
CPC ... *G05B 19/41845* (2013.01); *G05B 19/4183* (2013.01); *G06F 16/25* (2019.01);
(Continued)

(58) Field of Classification Search
CPC .......................................... G05B 2219/33125
See application file for complete search history.

(56) References Cited

U.S. PATENT DOCUMENTS 5,484,614 A * 1/1996 Clem ..................... A23G 3/021
426/231
7,738,973 B2 * 6/2010 McGreevy ......... G05B 19/4183
700/17
(Continued)

FOREIGN PATENT DOCUMENTS

CA 2968475 A1 * 6/2016 ....... G05B 19/41845
EP 2881820 A1 6/2015
(Continued)

OTHER PUBLICATIONS

International Preliminary Report on Patentability Application No. PCT/EP2015/076644 dated Feb. 23, 2018 9 pages.
(Continued)

*Primary Examiner* — Jennifer L Norton
(74) *Attorney, Agent, or Firm* — Whitmeyer IP Group LLC

(57) ABSTRACT

A process module is automatically configured for operation in a plant. During the operation of the process module in a first phase in a first operational environment, operational data that is related to the process module is received by a computer data system. In a second phase, when the process module is connected to a second operational environment, operational data is received again. The computer data system has a reply function that receives and processes a query and provides a response. Processing the query includes processing the operational data that was received during the first and second phases. The process module is then configured by using configuration parameters that are derived from the response.

16 Claims, 6 Drawing Sheets

(52) U.S. Cl.
CPC ..... *G05B 2219/33125* (2013.01); *Y02P 90/10* (2015.11); *Y02P 90/185* (2015.11); *Y02P 90/86* (2015.11)

(56) References Cited

U.S. PATENT DOCUMENTS

| | | | | |
|---|---|---|---|---|
| 8,293,669 | B2* | 10/2012 | Kirkpatrick | A23L 2/50 502/22 |
| 8,460,733 | B2* | 6/2013 | Wu | A23L 2/46 141/89 |
| 2002/0111948 | A1* | 8/2002 | Nixon | G05B 19/4145 |
| 2002/0118228 | A1* | 8/2002 | Bergo | G05B 19/409 715/765 |
| 2007/0198752 | A1* | 8/2007 | Danz | G05B 19/0423 710/8 |
| 2009/0199866 | A1* | 8/2009 | Kirkpatrick | A23L 2/50 134/3 |
| 2009/0259322 | A1* | 10/2009 | Danz | G05B 19/41845 700/9 |
| 2011/0257766 | A1* | 10/2011 | Sundaram | G05B 19/4185 700/7 |
| 2012/0078896 | A1 | 3/2012 | Nixon et al. | |
| 2012/0222701 | A1* | 9/2012 | Kirkpatrick | A23L 2/50 134/2 |
| 2013/0036198 | A1* | 2/2013 | Galm | B41F 33/0009 709/217 |
| 2013/0218306 | A1* | 8/2013 | Polzer | G05B 19/0428 700/79 |
| 2015/0158055 | A1* | 6/2015 | Kirkpatrick | A23L 2/50 134/22.11 |
| 2015/0331400 | A1* | 11/2015 | Birgel | G05B 19/0426 700/86 |
| 2016/0092193 | A1* | 3/2016 | Dallmann | G05B 19/0426 717/175 |
| 2016/0132048 | A1* | 5/2016 | Kambe | G05B 19/41845 700/87 |
| 2016/0323392 | A1* | 11/2016 | Lawson | G05B 19/4185 |
| 2017/0153616 | A1* | 6/2017 | Sakakibara | G05B 19/048 |
| 2018/0063244 | A1* | 3/2018 | Maturana | H04L 67/1097 |
| 2018/0086567 | A1* | 3/2018 | Henze | B65G 43/10 |
| 2018/0164789 | A1* | 6/2018 | Ikki | G05B 19/41845 |
| 2018/0203438 | A1* | 7/2018 | Henze | G05B 19/4184 |
| 2018/0356801 | A1* | 12/2018 | Baret | G05B 19/41845 |
| 2019/0114336 | A1* | 4/2019 | Mori | G06F 16/22 |

FOREIGN PATENT DOCUMENTS

| | | | | |
|---|---|---|---|---|
| GB | 2533852 A | * | 7/2016 | ....... G05B 19/41845 |
| WO | 2007125108 A1 | | 11/2007 | |
| WO | WO-2007125108 A1 | * | 11/2007 | ......... G06F 16/3329 |
| WO | WO-2018136403 A9 | * | 8/2018 | ............ B02C 25/00 |

OTHER PUBLICATIONS

International Search Report Application No. PCT/EP2015/076644 completed: Jul. 18, 2016; dated Jul. 25, 2016 2 pages.
Written Opinion of the International Searching Authority Application No. PCT/EP2015/076644 Completed Date: Jul. 18, 2016; dated Jul. 25, 2016 8 pages.

* cited by examiner

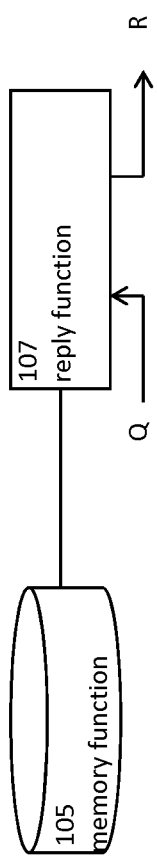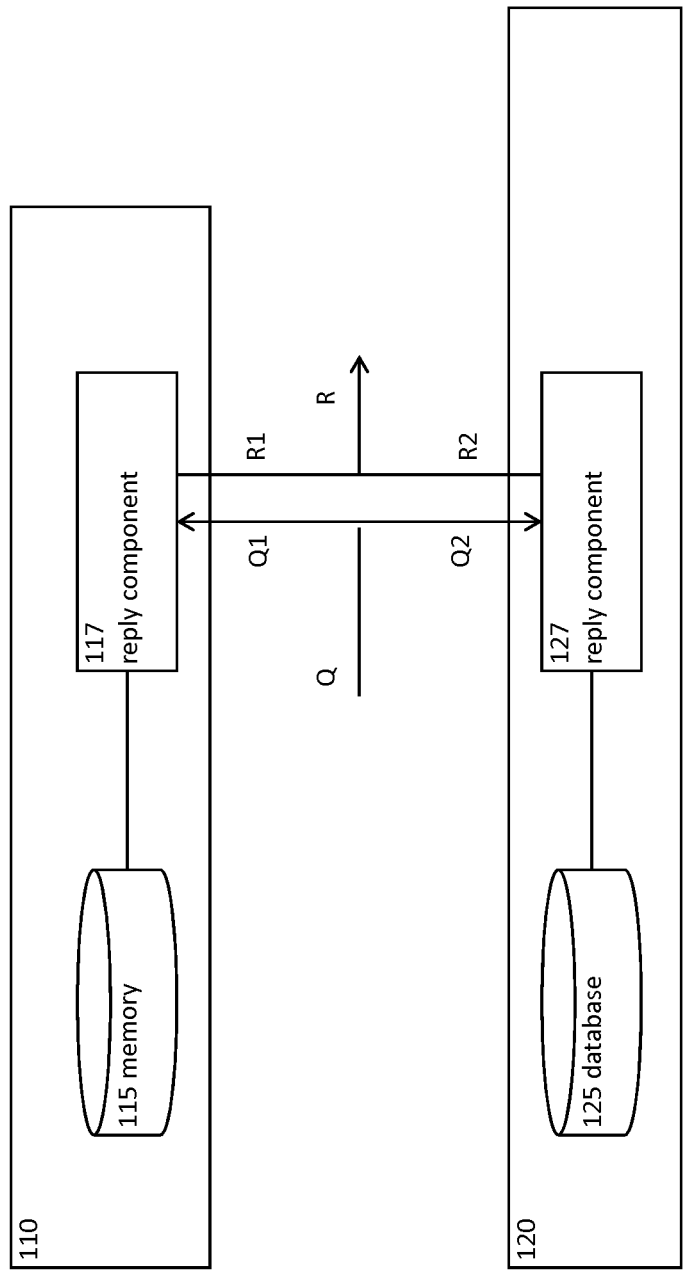
FIG. 4A
FIG. 4B

CONFIGURING PROCESS MODULES FOR OPERATION IN PLANTS

TECHNICAL FIELD

The present invention generally relates to industrial automation in plants, and more particularly, relates to system and method for configuring a process module in a plant.

BACKGROUND

Production facilities include a variety of plants, such as processing plants. For example, some processing plants process raw materials (such as oil and gas) to intermediate products (such as certain acids), and other plants continue processing to end products (such as detergents, fertilizers or other chemical substances). Processing usually requires one or more sequences of processing steps. Functional units (or process modules) are machines, reactors, tools, etc. that are specialized to perform particular processing steps. The same principle applies to other plants as well, to manufacturing plants for example.

In modern industry, there is an ongoing need for the production facilities to switch between different products within short time. Facility operators seek to accomplish such flexibility by adapting process modules for easy replacement or reconfiguration. The functionality of the process modules can change over time. For example, process modules can gain functionality through software updates, process modules can lose functionality through aging. As a consequence, replacement and/or reconfiguration is a task with more and more complexity. Complexity is further increased by the trend to let the process modules exchange data with each other, and to let process modules make decisions on a decentralized level based on such data.

Such and other developments in modern industry provide opportunities but face challenges. The developments are frequently discussed under topics such as "Industry 4.0" or "Internet of Things".

From a technical point of view, there are a number of constraints that arise from such developments. The constraints directly interfere with the operation of the production facility and can be decisive for success or failure.

SUMMARY

According to embodiments of the present invention, a process module is automatically configured for operation in a plant. This approach is described as a computer-implemented method, a computer system and a computer program product.

The process module is consecutively operated in different operational environments. During operation, a memory function collects data from the process module, such as data relating to physical objects at inputs and outputs of the module. The collected data remains stored even if the environment changes. A reply function receives a query and provides a response. Thereby the reply function uses that collected data. The response can be used to configure the operation of the process module. The memory and reply functions can be implemented by the process module itself, or by a computer data system that is coupled to the process module.

During the operation of the process module in a first phase in a first operational environment, operational data that is related to the process module is received by the computer data system. In a second phase, when the process module is connected to a second operational environment, operational data is received again. The computer data system has a reply function that receives and processes a query and provides a response. Processing comprises to process the operational data that was received during in the first and second phases. The process module is then configured by using configuration parameters that are derived from the response.

The first and second operational environments are defined by the presence of the process module in a particular plant. The process module can be physically moved between plants that have different other modules and that have different process control systems. In an alternative, the process module would physically stay within the same plant, but would be connected to different modules, or would be disconnected.

The operational data can be data that relates to further process modules that are physically connected to the process module.

The operational data can be stored in a module memory that is physically connected to the process module. The module memory can periodically forward the operational data to a database that is communicatively coupled to the process module, so that the operational data can be deleted from the module memory.

A data system for automatically configuring a process module for operation in a plant, in a computer system with a memory function and a reply function. The memory function is adapted to receive the operational data in relation to the process module during the operation of the process module in a first phase in a first operational environment. Consecutively, when the process module is connected to a second operational environment, the memory function is adapted to receive operational data in relation to the process module during the operation of the process module in a second phase in the second operational environment. The reply function is adapted to receive a query, to process the query by using operational data that was received during in the first and second phases. The reply function is further adapted to provide a response for configuring the process module by using configuration parameters that are derived from the response.

The memory function can be implemented by a module memory that is part of the process module, or implemented by a database that is part of the data system. The memory function can be implemented such that the operational data is selectively stored in both the module memory and in the database. The memory function can be implemented as a periodic data buffer, such that the module memory of the process module collects the operational data and forwards the data to the database of the data system periodically. The data does not need to remain in the module memory.

The computer program product when loaded into a memory of a computer and executed by at least one processor of the computer performs the steps of the computer-implemented method.

BRIEF DESCRIPTION OF THE DRAWINGS

FIGS. 4A and 4B illustrate a configuration function that receives, stores and processes data and that processes a query to a response, wherein FIG. 4A illustrates the concepts and FIG. 4B illustrates implementation details;

DETAILED DESCRIPTION

Figure 1:
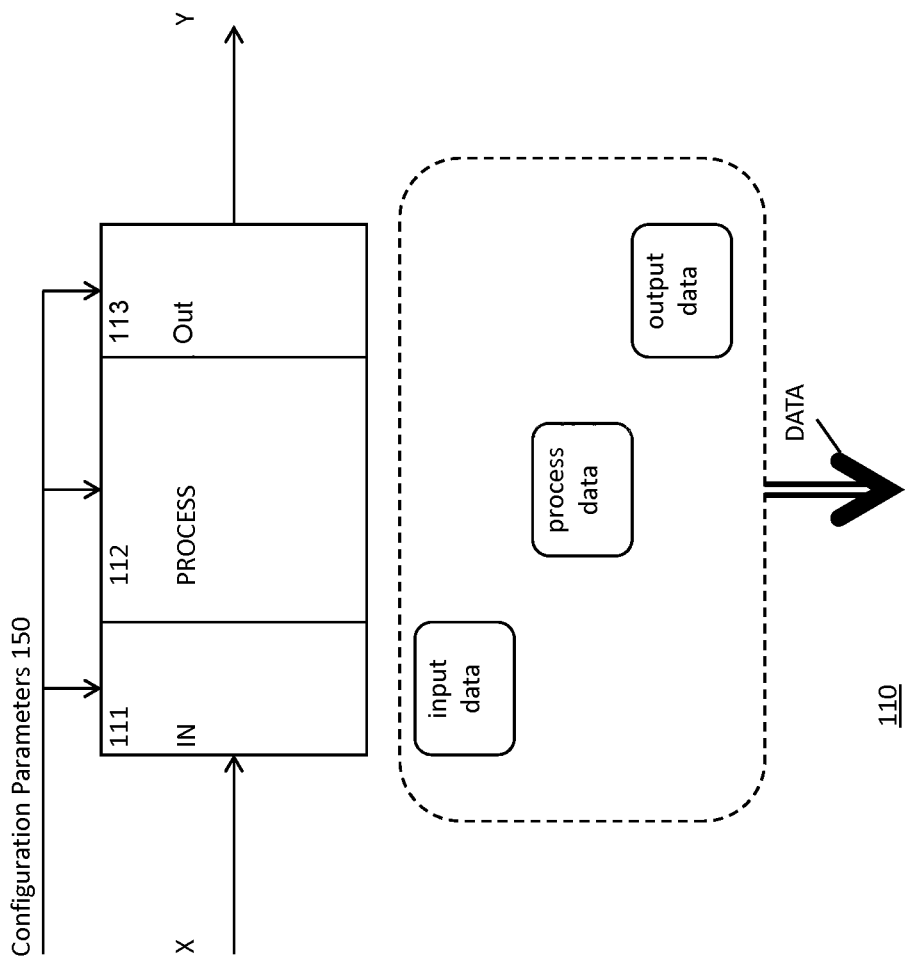
FIG. 1 illustrates a simplified model of a process module having an input, a processing block, and an output.
Figure 2:
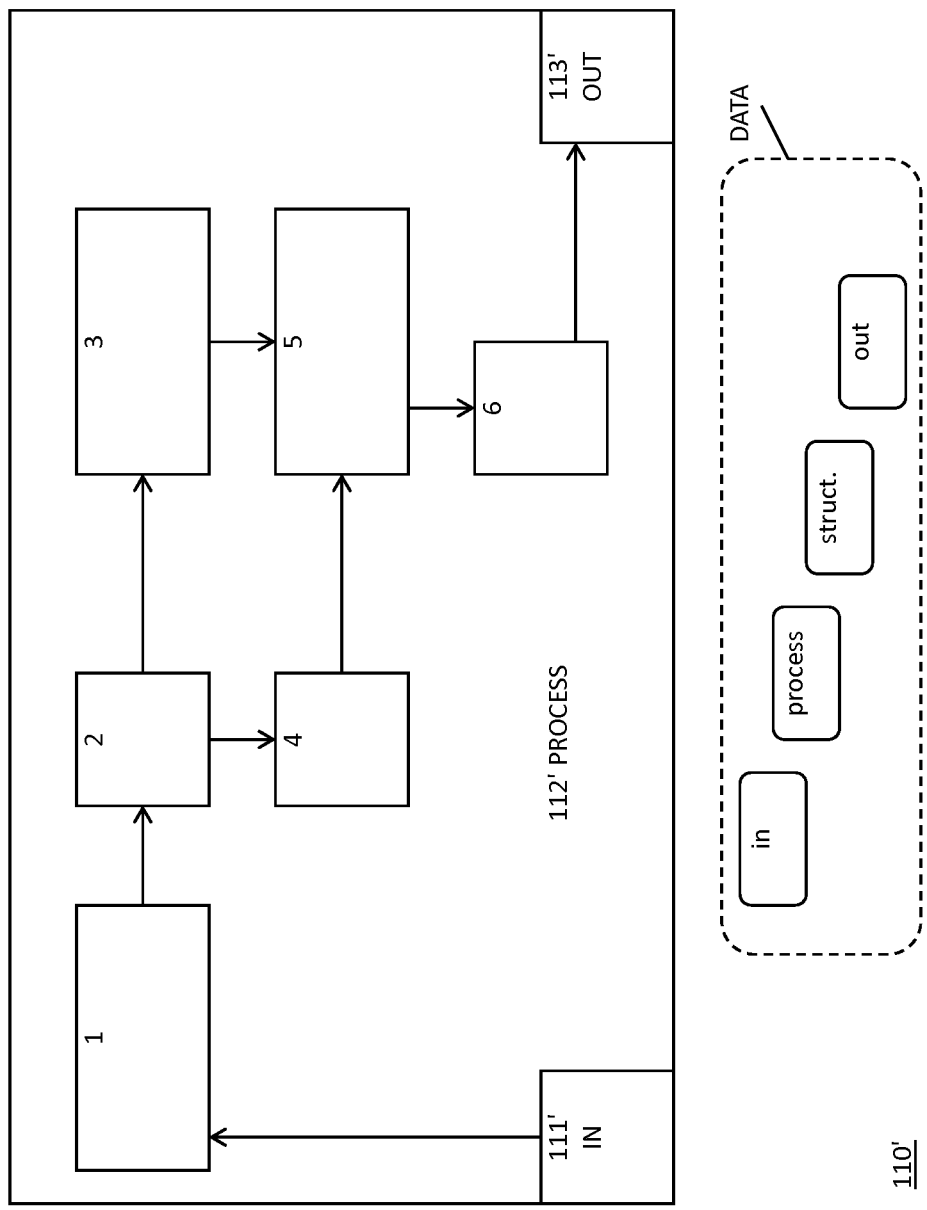
FIG. 2 illustrates a simplified model of the process module having the input, the processing block, and the output, with sub-modules.
Figure 3:
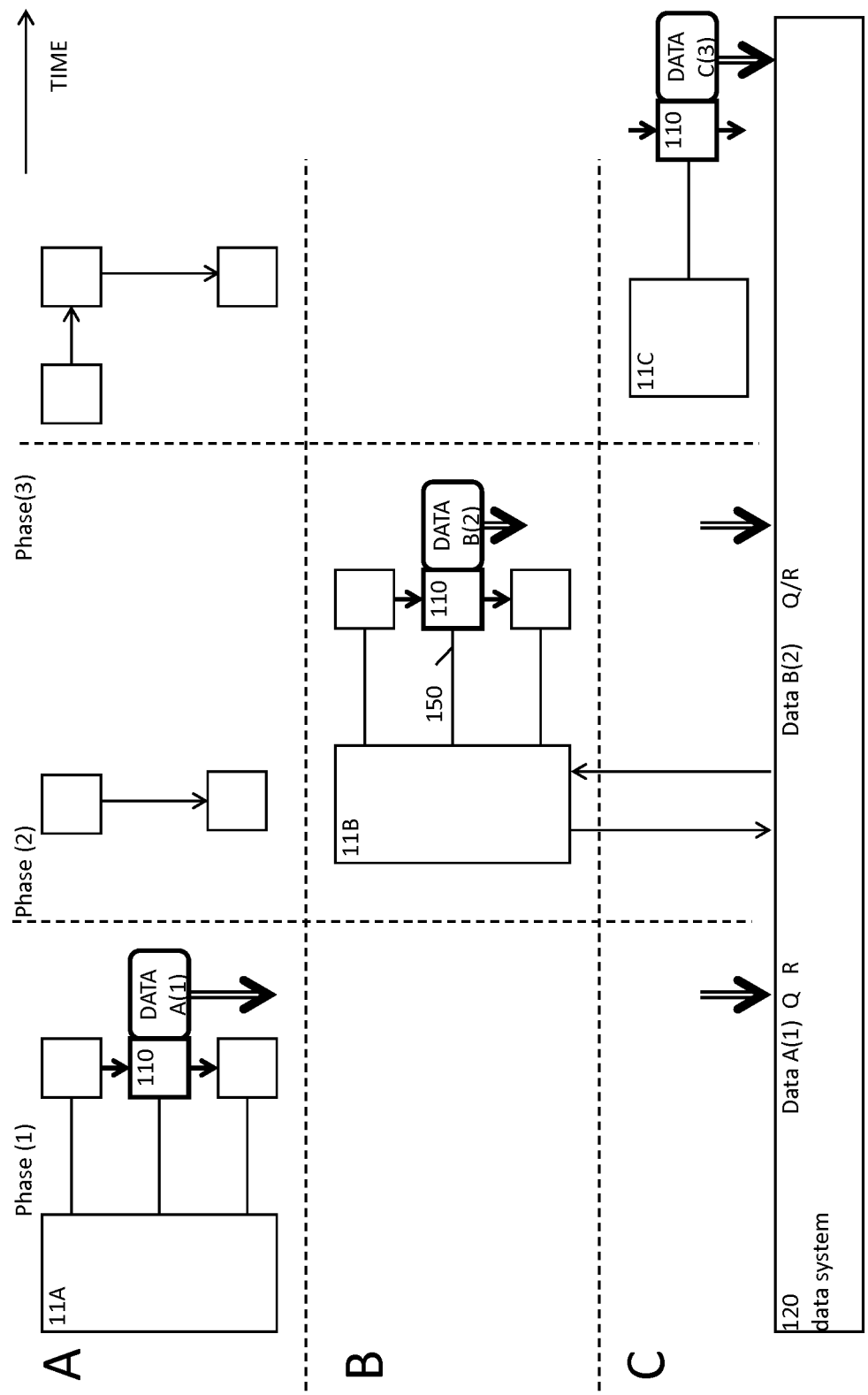
FIG. 3 illustrates three plants that are arranged differently at different time phases and that are using the same process module, and illustrates a data system.

The description introduces problem and solution by discussing a model of a process module in connection with FIGS. 1 and 2, continues with a scenario at overview level in connection with FIG. 3. In the scenario, data DATA is being collected during the operation of the process module at various plants. A data system processes queries (Q) and provide responses (R) by using the data. Control systems in the plant use the response to configure the process module. The description further explains the data system in connection with FIG. 4. The description continues with describing the method in connection with FIG. 5 and closes with a description of a generic computer in connection with FIG. 6.

FIG. 1 illustrates a simplified model of process module 110 having input 111, processing block 112, and output 113. The figure also illustrates data that become available during the operation, such as input data, process data, and output data. The particular types of data are illustrated by round-shaped rectangles. A data set that combines at least some of input data, process data and output data (of the process module) is referred to as operational data (or DATA, in uppercase letters) as illustrated by a "round" rectangle with a dashed line. A double-line arrow illustrates that DATA is forwarded for further processing.

Much simplified, process module 110 receives physical objects X (input objects, such as material, or workpieces), processes the physical objects, and provides the processed physical objects Y (output objects, intermediate product). Process module 110 can have further inputs (e.g., for energy) and further outputs (e.g., for waste). The following table gives simplified examples. Exemplary hardware of the processing block is given in parenthesis.

| IN | PROCESS | OUT |
| --- | --- | --- |
| liquid at an input temperature | heating or cooling the liquid (heater, cooler) | liquid at output, at a temperature that is different |
| salt, water | solving the salt (container, scales) | salt water |
| acid | extracting or adding water (container, valves, scales) | acid in different concentration |
| chocolate | molding (pipes, mold) | chocolate bar |
| water, hop, malt | brewing (container) | beer |
| semiconductor wafer | forming a pattern (reactor, exposure devices) | semiconductor wafer |
| semiconductor wafer | cutting (laser, or dicing saw) | semiconductor chips or dies |
| printed circuit board | drilling holes (machine, drill bits) | printed circuit board |

Input and output data represent physical properties of the input and output objects. Input and output data comprise data that relate to the quantity of the objects, such as the volume of a particular liquid (e.g., litres, hectolitres), the number of objects (e.g., the number of pieces in a particular batch), the weight of a particular material (e.g., kilograms) and so on.

Input and output data can comprise data relating to the quality at several granularity levels, such as the type of material (e.g., water, salt), an identification of a particular material (e.g., sulfuric acid), an identification of a particular batch (e.g., the charge of a chemical product), an identification of a particular classification (e.g., poisonous material, edible or non-edible, fertilizer) and so on.

Process data is data that represents physical properties of processing block 112. Process data can include parameters that are measured during operation and that relate to the operation, such as the temperature of operation (e.g. the temperature of the liquid), a number of typical movements (e.g., the overall number of holes in the circuit boards with the same drill bit), a duration of operation (e.g., beer brewing during 14 days), the duration of non-operation (e.g., standby, idle, repair).

Process data can include parameters that indicate a status, for example, a status regarding a total malfunction (e.g., function(s) disabled) or a partial malfunction (e.g., cooling function disabled, but heating function enabled), a status regarding auxiliary devices (e.g., firmware/software status of a controller that controls the process module; abrasion of the drill bits).

Process data can also include data regarding maintenance (e.g., maintenance records, maintenance schedule).

While DATA refers to data that leaves process module 110, configuration parameters 150 refer to data that controls the process module 110. Configuration parameters 150 can be related to the physical objects X (at the input), to the physical objects Y (at the output), to the process to be performed and the like. Configuration parameters 150 can be differentiated into parameters for preparation-time and for processing time (or "run-time"). Examples for preparation-time parameters comprise instructions to perform tests (e.g., does a valve properly open and close?), to perform to prepare production steps (e.g., clean a tool), or the like. Examples for run-time parameters comprise instructions to actually operate the process module (e.g., to heat a liquid to 80° C.), to enable or disable functions or the like.

FIG. 2 illustrates a simplified model of one embodiment of process module 110' having input 111', processing block 112', and output 113'. In difference to FIG. 1, sub-modules are also illustrated. Configuration parameters are forwarded to process module 110' as well. There can be configuration parameters for the process module 110' as a whole, and there can be configuration parameters for individual sub-modules. In process module 110', multiple sub-modules are interconnected with each other. Process module 110' could represent, for example, a chemical production line that has several reactors to refine oil into an intermediate product. DATA may also include structure data that relates to the connections between the sub-modules (i.e. interior topology model). In other words, the structure data represents the topology of process module 110' with its sub-modules. Structure data can be available in a variety of detail, such as to identify particular sub-modules and directed connections between the sub-modules (e.g., IN to 1, 1 to 2, 2 to 3, 2 to 4, 3 to 5, 4 to 5, 5 to 6, 6 to OUT), to identify the type or function of sub-modules (IN to a press module, from a press module to a heater module etc.)

Structure data can by associated with formal descriptions of control algorithms that describe the operation of the process module (e.g., information on temperature changes during heating or cooling).

Structure data can further comprise status transition schemes (e.g., heater "on" to the state "heating").

The DATA is data about the technical process that occurs (or has occurred) inside process module 110. The distinction of DATA into input data, process data, output data, or even structure is convenient for explanation. Usually, DATA combines some of these aspects. For example, for a reactor in a semiconductor wafer fab, DATA comprises process data such as the number of operating hours, an indication what chemical substances have been used, the time interval of operation in different states (e.g., processing wafers vs. cleaning the reactor), an indication of failures or defects, or a maintenance history (operative, stand-by, idle), input/output data with respect to the number of wafers and so on.

There can be measurement devices (e.g., sensors, scales, thermometers, counters) that can obtain data from the process module. The structure is usually available in documentation, or in a control system (cf. FIG. 3).

But obtaining and processing the DATA that relates to process modules (110, 110') shows a number of constraints. Some of the constraints will be explained in the following. It is noted that not necessarily all constraints do occur. The solution will then be explained with more detail.

(i) Quantity

The quantity of DATA can increase during operation of the process module. This can be especially relevant for so-called run-time information, information that becomes available during operation.

(ii) Quality/Heterogeneous Structure

As DATA originates from a variety of sources, DATA can technically be available in different data formats, or data transmission protocols. The compatibility between DATA sender and DATA recipients may be limited.

(iii) Structure

DATA may be related to the structure of the overall arrangement of the modules (cf. FIG. 2), and the structure or topology. Implementing a particular sequence of processing steps can be decisive to success or failure. An inappropriate sequence can lead, for example, to errors, incompatible intermediate or final products, to safety hazards or the like. For example, a process module might output a material that does not fit to subsequent production steps.

(iv) Engineering Data

DATA can include data obtained before, during and after operating of the process module and that mainly relates to the technical implementation of the processing block. But such data can be provided out of a variety of human made sources, such as drawings, plans, procedures and so on.

(v) Multiple Uses

The above distinction into input, process, output or even structure data is convenient for explanation, but from a technical point of view, the distinction is not required. Some process modules can communicate with other modules (e.g., for transportation or materials or products) so that output data can become input data. Some of the process modules may produce physical output that has to be disposed of (e.g., waste, carbon-dioxide), but for that data becomes relevant (e.g., the quantity of waste or carbon-dioxide). The process modules may require physical input objects or other input that are common across many modules, such as electrical energy, water, pressurized air, lubricants and so on.

(vi) Different Data Consumption Purpose

Some portions of DATA can control the technical operation of the process module (e.g., temperature data in a control loop to stabilize the temperature), or control the operation of the process module of a subsequent production step (e.g., a concentration value for an acid)

(vii) Asynchronous Data Consumption

Some portions of DATA can be used immediately, such as data that controls technical operations. Some portions can be used with delay, so that storing or buffering is required.

(viii) Different Module Availability Stages

During its lifecycle, a module is usually being planned and engineered, manufactured and placed into service or commissioned. Data can become available during substantially all phases, but may be stored in different systems.

(ix) Product Safety, Process Safety

Input, process and output data (or even structure data) can relate to the safety of a product. For example, processing hazardous material (e.g., fertilizers can be poisonous) may require extensive cleaning operations, and overheating a chemical reactor may destroy it.

The constraints usually occur in combination, and can complicate certain activities. For example, retrieving data is constrained by quantity and structure of the DATA.

It is noted that plant operators (such as enterprises) use enterprise resource planning (ERP) systems, or other computer systems to keep track of data, but the focus of such systems is often on the input/output efficiency.

The following scenario illustrates some of the constraints, but also offers the solution.

FIG. 3 illustrates three plants A, B and C that are arranged differently at different time phases (1), (2) and (3) and that are using process module 110. FIG. 3 also illustrates data system 120. In this embodiment, process module 110 is being configured by configuration parameters 150 that are obtained from data system 120 by processing DATA and by processing query Q that leads to a response R.

The plants are examples for operational environments of the modules. Other examples are can be found in areas such as in factories for manufacturing discrete products, assembly lines, and filing or packaging facilities.

In the figure, the time progresses from left to right. Dashed horizontal lines symbolize borders between the plants. The borders can be physical borders (plants in different buildings), but also can be "legal borders" in cases the plants belong to different legal entities. Dashed vertical lines symbolize transitions between phases. The dashed lines conveniently divide FIG. 3 into fields A(1), A(2), . . . C(3). Among these fields, the diagonally arranged fields A(1), B(2) and C(3) can be considered as focus fields for a typical scenario.

Plants A, B and C use process modules that are symbolized by squares, among them process module 110. Material flow (or other interconnections, cf. FIGS. 1-2) between process module 110 and the other modules is symbolized by arrows with plain lines. The plants A, B and C are equipped with process control systems 11A, 11B and 11C. The process control systems exchange data with the modules insides the plant (plain horizontal lines, e.g., via a bus). For simplicity, the control systems are only illustrated for the focus fields, but they are available all the time in the respective plants.

As illustrated in FIG. 3, process control systems send out the query (or queries) and receives the response (or responses). In other words, data system 120 receives the query and provides the response. However, this is not necessary for all implementations, the query can be received from elsewhere, for example, from a user-interface, and the query can be received by a different entity.

Process module 110 shows a feature or behaviour that can be more and more frequently observed in industry: Process module 110 is physically the same module, but at the beginning of a new phase, process module 110 is physically being connected to other modules, and/or connected to other control systems. Thereby, process module 110 is being adapted to the new environment (plant, connection etc.). The adaptation can comprise that the module receives configuration parameters (cf. 150 in FIG. 1). Such parameters can be communicated to the module, for example, as control instructions from the process control systems 11A, 11B or 11C. However, parameters can also be communicated manually, for example, by a human operator who is reading instructions from process control systems 11A, 11B or 11C and manually adjusts the parameters.

The re-connection (or re-commissioning) can be accomplished in principally two ways. First—and this is the focus scenario—process module 110 would be physically moved between plants. The plants have different other modules, and have different process control systems. FIG. 3 illustrates that first scenario by the focus fields: process module 110 is used by plant A in phase (1), by plant B in phase (2) and by plant C in phase (3). Process module 110 can legally be owned by a separate entity that rents or leases the module to plant operators according to their requirements. Looking at process module 110 at plant B, plant A is the "predecessor user" (or "prior user") and plant C is the "successor user" (or "subsequent user").

In a second scenario (not illustrated), module 2 would physically stay within the same plant A, but would be connected to different modules, or would be disconnected.

However, in view of the above-mentioned constraints, both scenarios can lead to technical problems (that will be explained for process module 110). The problems are mainly related to DATA (cf. FIGS. 1-2) that includes runtime and engineering information received and/or collected during the phases. The above-explained constraints tend to make the problems more severe.

Functional Connection Between Prior Use Data and Current Use

Module usage data DATA A(1) is data that, for example, includes runtime and engineering information collected while process module 110 is in use at plant A. DATA A(1) would be forwarded to the process control system 11A. The same principle applies to DATA B(2) and process control system 11B, and DATA C(3) and control system 11C. In other words, there is DATA that becomes available as process module 110 moves through the focus scenario, but this DATA is captured by different control systems. DATA A(1) is prior use data to B(2). DATA A(1) in combination with DATA B(2) is prior use data to C(3).

Prior use data can be relevant for the operation of module 110, and for the product (or intermediate product). Depending on the prior use data, a current use (e.g. in plant B) might become impossible, or limited (e.g., due to safety concerns).

Non-Availability of the Prior Use Data

Prior use data (e.g. Data A(1)) may include data that is particularly relevant for the prior user (e.g., operator of plant A) and, especially for data protection reason, must not be forwarded to the post/subsequent user. For example, plant A may have used process module 110 with highly concentrated acid (requiring special cleaning). There is data incompatibility, e.g., between control system 11A and control system 11B.

Data A(1) is specific to use in plant A and the connection to other modules (plant specific process), but the operator of plant B does not have the insight.

As a solution, computer data system 120 (or "data system" in short) receives DATA from process module 110 and makes it (at least partially and rule-driven) available again to process module 110 and/or to control systems 11B and 11C during further use (of process module 110). Data system 120 can be considered as a specialized plant information management system (PIMS), a process information management system, a data handling system, a combined data storage and retrieval system or the like.

In the example of FIG. 3, data system 120 receives DATA A(1) (from module 110 operating in plant A during phase (1)), receives DATA B(2) (from module 110 operating in plant B during phase (2)), and receives DATA C(3) (from module 110 operating in plant C during phase (3)). Data system 120 can receive DATA also through process control systems 11A, 11B or 11C. Data system 120 would be a system that is separate from process control systems 11A, 11B or 11C.

A control system can query (Q) data system 120 for a sub-set of DATA in form of a response (R). FIG. 3 illustrates Q/R cycles for control systems 11B and 11C. The control systems use the responses R to derive configuration parameters 150 that are forwarded to process module 110.

FIGS. 4A and 4B illustrate a configuration function that receives, stores and processes data and that processes a query to provide a response, wherein FIG. 4A illustrates the functional concepts and FIG. 4B illustrates implementation details.

FIG. 4A illustrates configuration function 105/107 that receives, stores and processes DATA by memory function 105 and that processes query Q to response R by reply function 107. Both functions are interrelated. Memory function 105 receives and stores DATA. Reply function 107 processes DATA, receives query Q and provides response R. Response R can be used directly as configuration parameter (150 in FIG. 1) or can be forwarded to process control systems 11A, 11B or 11C (cf. FIG. 3) that uses response R to obtain configuration parameters 150.

To implement the functionality of configuration function 105/107, several options are available.

FIG. 4B illustrates configuration function 105/107 in a distributed implementation in that the functions are distributed to process module 110 and to data system 120. The functions can be available in both process module 110 and data system 120, in process module 110 alone, or in data system 120 alone.

To implement memory function 105, module memory 115 can be part of process module 110, and database 125 can be part of data system 120.

To implement reply function 107, process module 110 can have reply component 117 (query Q1, response R1), and data system 120 can have reply component 127 (query Q2, response R2).

Reply component 117/127 can be implemented as modules in software. Process modules 110 with module memory 115 and reply component 117 can be regarded as a satellite sub-system to data system 120.

Process module 110 and data system 120 are communicatively coupled or connected to exchange data, queries and/or responses (bi-directionally). Data system 120 can be coupled to a plurality of modules, for example to substantially all of the modules in plant (1)(2) and (3) (cf. FIG. 3). Persons of skill in the art can implement the identification of a particular memory by providing identification of module memory 115, such as unique identification.

Database 125 (or data system 120 as a whole) can provide DATA handling and Q/R handling for example, as Software as a Service (SaaS). Implementing computers outside the premises of a plant is possible and well-known, for example, under the term "cloud computing".

The query Q arrives at data system 120, query Q can also arrive at process module 110 (as Q1). Exclusivity is not required, so that the query Q can also arrive at both process module 110 (as Q1) and at data system 120 (as Q2) at substantially the same time.

In data system 120, database 125 provides the response R2. Likewise, process module 110 can interact with module memory 115 and can provide the response R1. Responses R2 and R1 can be different, but for purposes of explanation they are collectively referred to a response R.

The storage capabilities can be different: module memory 115 can be implemented as a specially allocated memory portion of a controller that controls the operation of process module 110. Or, module memory 115 can be implemented as a semiconductor, non-volatile memory, such as flash-memory. Database 125 can be implemented by an off-the-shelf database, with back-up functionality, etc. Module memory 115 is local memory compared to database 125 that is global memory.

There is a distribution of computational resources between data system 120 and process module 110. This distribution also addresses some of the constraints given above. The distribution is explained by way of example.

Storing all of the prior use data in module memory 115 (that is associated with process module 110) may not be feasible due to memory limitations. DATA is therefore stored in module memory 115, in database 125, or in both module memory 115 and database 125. In other words, DATA is selectively stored. For example, storing DATA in module memory 115 can be limited to storing an identifier (e.g., a URL) to the data in database 125. Such an identifier would remain unchanged at least over the phases (1)(2)(3) (cf. FIG. 3), and according to the implementation would remain unchanged over the complete lifetime of the module.

Storing DATA in database 125 can be expanded to storing complete images of the software and data of process module 110 (virtual image).

Selectively storing can be implemented by periodic data buffering. DATA can be collected in module memory 115 (in process module 110) and can be forwarded to database 125 (in data system 120) periodically (e.g., every hour or every day) without remaining in module memory 115. In other words, DATA is stored in a first memory (module memory being on-device memory) and transferred to the second memory (i.e., the database). This approach saves memory in process module 110.

Selectively storing can be implemented by classifying DATA according to pre-defined rules, some data portions can remain stored in module memory 115.

Periodically forwarding DATA (or portions) can be implemented in a pull scenario with database 125 requesting data from module memory 115. A push scenario in that module memory 115 forwards data without receiving a request is also possible.

Retrieving can be distributed as well. For example, depending on the storage location (module memory 115 or database 125), reply component 117 or reply component 127 is activated. A response R (or reply R) can have portions R1 and R2 from the reply components 117 or 127, respectively.

In the following, the descriptions will explain some approaches to process the query Q into the response R. Person of skill in the art can find the optimal distribution, but all approaches could be implemented on either side.

The query Q can be human user query, or can be a computer query. A human user query can be raised, for example, by an engineer who is configuring a plant or by a process specialist who is supervising a production process that is ongoing in a plant that uses the process module. The query can have a number of forms, such as a structured query with variables, or a query in natural language (i.e. a question). A computer query can be received, for example, from a different module that belongs to the same plant.

Processing query Q takes time, but this should be minimized. Also, answering every query Q is not desired, for a number of reasons, such as data privacy.

Reply component 117/127 can use technologies such as artificial intelligence (with graph theory, neural networks, knowledge based approaches, rule based approaches) to implement a decision process.

For example, at phase (2), a query should be "which modules are involved in filling the tank of module 110?" The reply component categorizes the query. In the example, the query relates to the input ("filing" is related to "inputting objects", "tank is related to objects that are liquids) with relation to structure data ("tank" is hardware). The reply component searches a graph that represents the structure of the plant (topology) and that represents objects being input to modules), and identifies the modules that are predecessors in an object processing chain. The response is a list of the identified process modules.

In a different example, the query Q is directed to a yes/no response whether process module 110 is compatible with other modules that provide input objects (to module 110) or that receive output objects (from module 110). The implementation of reply components 117/127 can uses state and state transitions. For example, process module 110 being a heater/cooler (cf. the first line in the above table) can have the states "food allowed" and "food denied". Ontologies can be used to classify some input materials as trigger for state changes. Data that represents input such as "water " or "chocolate" do not change the state, but data standing for input such as "cleaning liquid", or "salt water" does change the state to "food denied". A query Q to the compatibility of a further process module (e.g., the chocolate press) would be resulted in the response R=NO (because "food denied").

The reply component can classify the query (or question) according to ontologies (as mentioned) or according to other pre-defined rules. For example, the reply component can distinguish the query according to development phases and can select a sub-set of DATA.

(i) If the reply component identifies the query to be in relation to the structure of the plant, the module, or any sub-modules, the reply component browses through data that represents structure (structure data, dependency model).

(ii) If the reply component identifies the query to be in relation to maintenance of the module, the reply component can check the history of the maintenance.

(iii) If the reply component identifies the query to be in relation to engineering, the reply component can look up for historic data, can check status and other data to identify the function that the module provides.

The reply component can classify the query even according to the above-mentioned constraints: a query can relate to the quantity (e.g., how much?). A query can relate to engineering data so that the response includes a formalized and computer-readable description (e.g., using XML) of the process module, optionally including its states (e.g., <food>allowed</food>; also at least partially answering availability), its history and so on. As the constraints are interrelated, combinations are possible. For example, a query relating to the maximum possible temperature of a heater (T MAX=?) can result in a reply such as:

100° C.<food>allowed</food>

200° C. <food>denied</food>AND <fire hazard>yes</fire hazard> thus indicating the availability/non-availability to process food, but also indicating safety relevant data for the higher temperature value.

During the lifecycle of module 110, such as during operation, the reply function can be trained. For example, reply component 117/127 can receive multiple queries Q1, Q2 etc. that are slightly different, but that arrive at typical contexts ("How many degrees?", "What is the internal temperature?", "How many Celsius?" "Maximum temperature reached?") The reply component learns from the questions, to output a temperature value. For example, "Celsius" and "degree" are recognized here as synonym for the meaning "temperature", pattern matching technologies can be used in general.

The reply component can ask back, to obtain more details for the particular query.

DATA can be used to provide or enhance documentation. The documentation can be a documentation that describes a particular modules and its environment practically at any given point in time. Text editing applications or content management applications (in a further computer) can receive data (derived from DATA) to complete the documentation.

Using data from the modules (without human interaction) can increase the accuracy of the documentation. For example, the topology of the plant is a topology of the plant that is actually operating, and such real-time, run-time topology can be documented.

Figure 5:
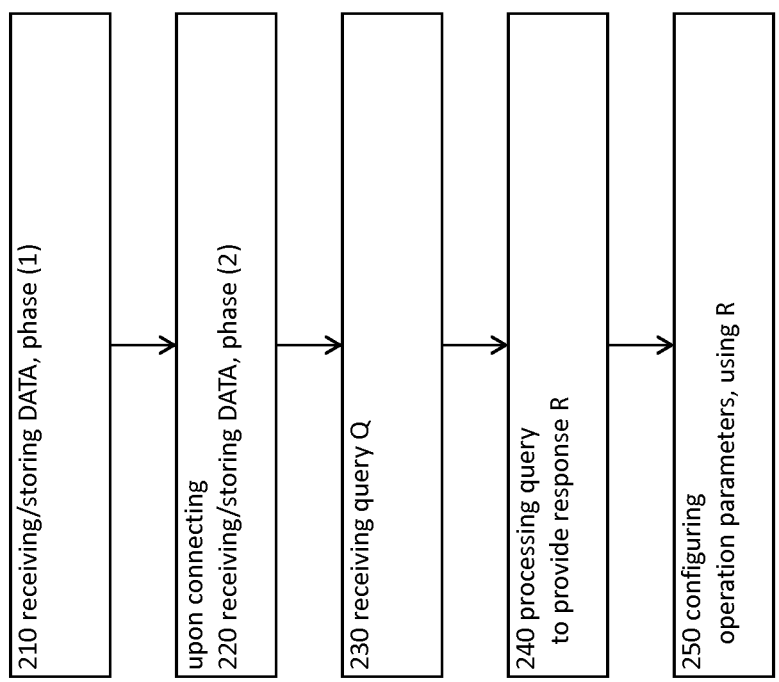
FIG. 5 illustrates a flow chart of a method to automatically configure the process module for operation in a plant.

FIG. 5 illustrates a flow chart of method 200 to automatically configure process module 110 for operation in a plant.

In step receiving 210, operational data (Data A(1)) is received in relation to process module 110 during the operation of process module 110 in a first phase in a first operational environment. This is illustrated and explained in connection with FIG. 3, phase (1) in environment A. Phase (2) in environment B would be applicable as well.

Upon connecting process module 110 into a second operational environment of a second phase, in step receiving 220, operational data is received in relation to module 110 during a second phase in a second operational environment. In FIG. 3, this is DATA (2)B, or DATA(3)C as the case may be.

In step receiving 230, reply function 107 (reply component 117/127) receives query Q. As a consequence, in step processing 240, reply function 107 processes query Q and provides response R accordingly.

In step configuring 250, response R is used to configure process module 110 through configuration parameters 150. As explained above, this is implemented directly with R being a configuration parameter, or indirectly with R being input to a process control system.

As mentioned, the first and second operational environments are defined by the presence of process module 110 in a particular plant.

Optionally, step receiving 210 operational data can comprise to receive data DATA that relates to further process modules that are physically connected to the process module. In other words, this relates to the structural aspect of DATA.

Storing the DATA (cf. memory function 105) can be implemented by module memory 115 that is physically connected to the process module 110, as explained above in connection with FIG. 4. Optionally, storing can comprise to periodically forward the operational data to database 125 that is communicatively coupled to the process module 110, and to delete the operational data from the module memory 115. The memory-saving aspect of this approach is explained in connection with FIG. 4 as well.

Receiving 230 the query (Q) by the reply function can be performed by receiving the query from a process control system (11A, 11B, 11C, as in FIG. 3) and configuring 250 the process module can be performed by forwarding the response to the process control system.

FIG. 5 and FIG. 4AB also illustrate a computer program or a computer program product. The computer program product—when loaded into a memory of a computer and being executed by at least one processor of the computer—performs the steps of the computer-implemented method. So in other words, the blocks in the flow chart of FIG. 5, and the blocks for the functions in FIG. 4AB stand for instructions that can be implemented by a computer under the control of the program.

Figure 6:
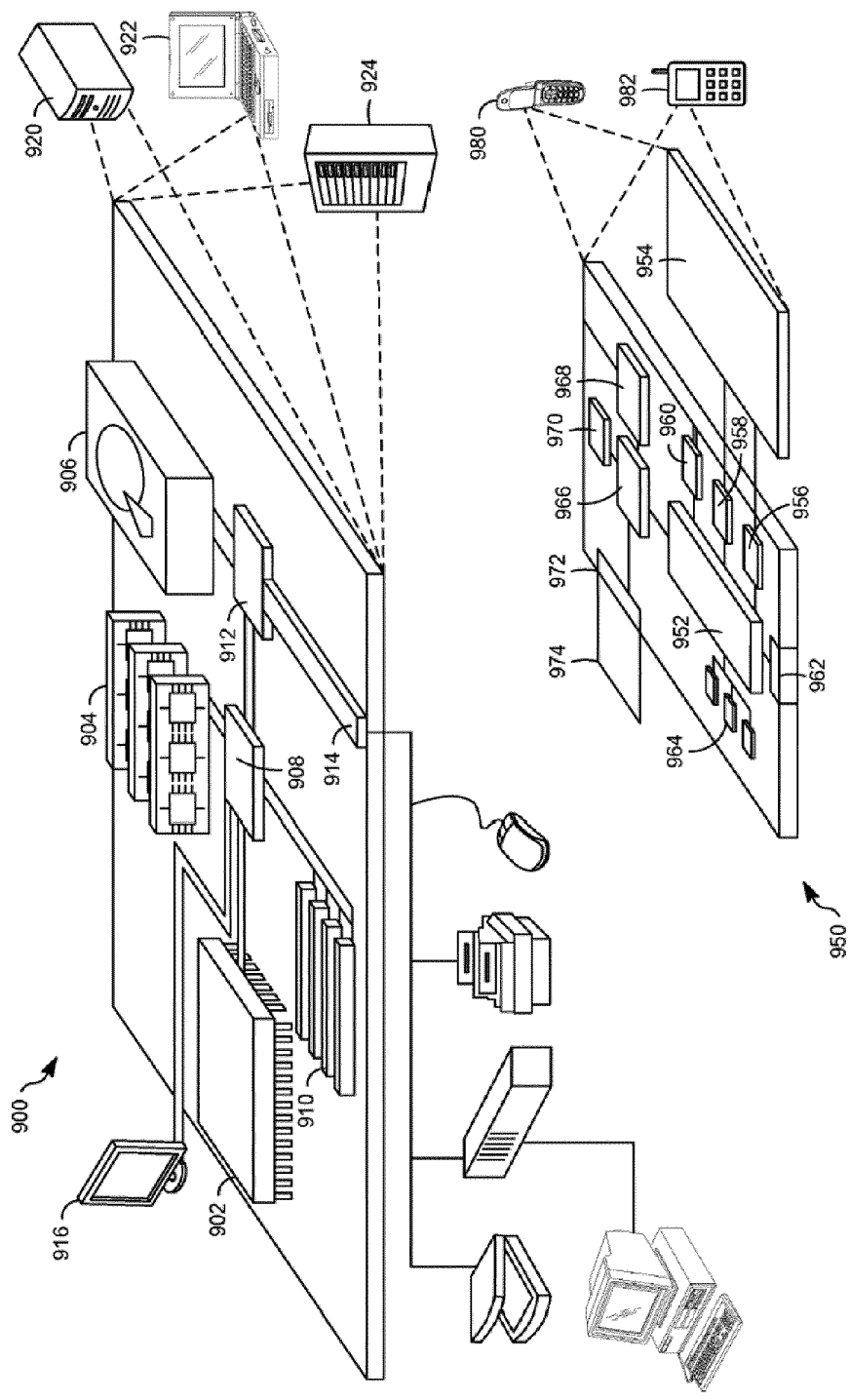
FIG. 6 illustrates a diagram for an example of a generic computer device and a generic mobile computer device, which may be used with the techniques described here.

FIG. 6 is a diagram that shows an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Generic computer device may 900 correspond to the computer data system 120 of FIG. 3 or correspond to computers that are associated with the processing module 110, 110'. Computing device 950 is intended to represent various forms of mobile devices, such as personal digital assistants, cellular telephones, smart phones, and other similar computing devices. For example, computing device 950 may include the data storage components and/or processing components of agent devices as shown in FIG. 1. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analogue and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 984 may also be provided and connected to device 950 through expansion interface 982, which may include, for example, a SIMM (Single In Line Memory Module) card interface. Such expansion memory 984 may provide extra storage space for device 950, or may also store applications or other information for device 950. Specifically, expansion memory 984 may include instructions to carry out or supplement the processes described above, and may include secure information also. Thus, for example, expansion memory 984 may act as a security module for device 950, and may be programmed with instructions that permit secure use of device 950. In addition, secure applications may be provided via the SIMM cards, along with additional information, such as placing the identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 984, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 980 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

The invention claimed is:

1. A method to automatically configure a process module for operation in a plant, the process module being a heater and/or cooler with two states designating food allowed and food denied, the method comprising:

receiving first operational data (DATA A(I)) relating to the process module during operation of the process module in a first phase in a first operational environment in a first plant (A) and storing the first operational data (DATA A(I)) by a memory function in a data system, wherein the process module in the first phase is used with concentrated acid and is in a first state of food denied;

upon disconnecting the process module from the first operational environment in the first plant (A) and connecting the process module into a second operational environment in a second plant (B), receiving second operational data (DATA B(2)) relating to the process module in a second phase in the second operational environment and storing the second operational data (DATA B(2)) by the memory function in the data system;

receiving a query (Q) by a reply function in the data system, the query (Q) being directed to whether the process module is compatible with other modules in a third operational environment in a third plant (C), the other modules being configured to provide input objects to the process module or receive output objects from the process module;

providing a response (R) using the reply function in the data system by processing the query (Q), the first operational data (DATA A(I)), and the second operational data (DATA B(2)), said processing includes distinguishing the query (Q) according to the first and second phases and using ontologies to classify the input objects as triggers for state changes, wherein data representing a first input object that comprises cleaning liquid or salt water does not change the state of the process module which is food denied, but data representing a second input object that comprises water or chocolate does change the state of the process module to food allowed, wherein the response (R) includes whether there is a change in the state of the process module; and deriving configuration parameters from the response (R) via a process control system and configuring the process module using the configuration parameters that are derived from the response (R).

2. The method according to claim 1, wherein the first and second operational environments are defined by a presence of the process module in the first plant (A) and the second plant (B), respectively.

3. The method according to claim 1, wherein the first operational data (DATA A(I)) and the second operational (DATA A(2)) each include data that relates to further process modules that are physically connected to the process module.

4. The method according to claim 1, wherein storing the first operational data (DATA A(I)) includes storing the first operational data (DATA A(I)) in a module memory that is physically connected to the process module.

5. The method according to claim 4, wherein storing the first operational data (DATA A(I)) comprises periodically forwarding the first operational data (DATA A(I)) to a database that is communicatively coupled to the process module and deleting the first operational data (DATA A(I)) from the module memory.

6. The method according to claim 1, wherein receiving the query (Q) by the reply function comprises receiving the query (Q) from a process control system of a corresponding plant (A, B), and wherein configuring the process module comprises forwarding the response (R) to the process control system of the corresponding plant (A, B).

7. The method according to claim 1, wherein at least one of the first operational data (DATA A(I)) or the second operational data (DATA B(2)) is a data set that combines input data, process data, and output data of the process module.

8. A data system for automatically configuring a process module for operation in a plant, the process module being a heater and/or cooler with two states designating food allowed and food denied, the data system comprising:
a memory function receiving first operational data (DATA A(I)) relating to the process module during operation of the process module in a first phase in a first operational environment in a first plant (A), wherein the process module is used with concentrated acid and is in a first state of food denied;
upon disconnecting the process module from the first operational environment in the first plant (A) and connecting the process module into a second operational environment in a second plant (B), the memory function receiving second operational data (DATA B(2)) relating to the process module in a second phase in the second operational environment in the second plant (B);
a reply function receiving a query (Q), the query (Q) being directed to whether the process module is compatible with other modules in a third operational environment in a third plant (C), the other modules being configured to provide input objects to the process module or receive output objects from the process module, the reply function providing a response (R) by processing the query (Q), the first operational data (DATA A(I)), and the second operational data (DATA B(2)),
wherein said processing includes distinguishing the query (Q) according to the first and second phases and using ontologies to classify the input objects as triggers for state changes, wherein data representing a first input object that comprises cleaning liquid or salt water does not change the state of the process module which is food denied, but data representing a second input object that comprises water or chocolate does change the state of the process module to food allowed, wherein the response (R) includes whether there is a change in the state of the process module; and
the data system configures the process module using configuration parameters that are derived from the response (R).

9. The data system according to claim 8, wherein the memory function is implemented by a module memory that is part of the process module and/or implemented by a database that is part of the data system.

10. The data system according to claim 9, wherein the memory function is implemented such that the first operational data (DATA A(I)) is selectively stored in both the module memory and in the database.

11. The data system according to claim 10, wherein the memory function is implemented by a periodic data buffer, such that the first operational data (DATA A(I)) is being collected in the module memory of the process module and being forwarded to the database of the data system periodically, without remaining in the module memory.

12. A computer program product that, when loaded into a memory of a computer and executed by at least one processor of the computer, causes the at least one processor to perform a method of configuring a process module for operation in a plant, the process module being a heater and/or cooler with two states designating food allowed and food denied, the method comprising:
receiving first operational data (DATA A(I)) relating to the process module during operation of the process module in a first phase in a first operational environment in a first plant (A) and storing the first operational data (DATA A(I)) by the memory of said computer, wherein the process module in the first phase is used with concentrated acid and is in a first state of food denied;
upon disconnecting the process module from the first operational environment in the first plant (A) and connecting the process module into a second operational environment in a second plant (B), receiving second operational data (DATA B(2)) relating to the process module in a second phase in the second operational environment and storing the second operational data (DATA B(2)) by the memory of said computer;
receiving a query (Q) by a reply function of said at least one processor, the query (Q) being directed to whether the process module is compatible with other modules in a third operational environment in a third plant (C), the other modules being configured to provide input objects to the process module or receive output objects from the process module;
providing a response (R) using the reply function of said at least one processor by processing the query (Q), the first operational data (DATA A(I)), and the second operational data (DATA B(2)), said processing includes distinguishing the query (Q) according to the first and second phases and using ontologies to classify the input objects as triggers for state changes, wherein data representing a first input object that comprises cleaning liquid or salt water does not change the state of the process module which is food denied, but data representing a second input object that comprises water or chocolate does change the state of the process module to food allowed, wherein the response (R) includes whether there is a change in the state of the process module to food allowed; and configuring the process module using configuration parameters that are derived from the response (R) by said at least one processor.

13. The method according to claim 2, wherein the first operational data (DATA A(I)) and the second operational (DATA A(2)) each include data that relates to further process modules that are physically connected to the process module.

14. The method according to claim 2, wherein storing the first operational data (DATA A(I)) includes storing the first operational data (DATA A(I)) in a module memory that is physically connected to the process module.

15. The method according to claim 2, wherein receiving the query (Q) by the reply function comprises receiving the query (Q) from a process control system of a corresponding plant (A, B), and wherein configuring the process module comprises forwarding the response (R) to the process control system of the corresponding plant (A, B).

16. The method according to claim 2, wherein at least one of the first operational data (DATA A(I)) or the second operational data (DATA B(2)) is a data set that combines input data, process data, and output data of the process module.

* * * * *